United States Patent [19]
Stechly

[11] Patent Number: 5,835,268
[45] Date of Patent: Nov. 10, 1998

[54] SCREEN MOUNTING APPARATUS

[75] Inventor: Paul Michael Stechly, Mississauga, Canada

[73] Assignee: Applied Electronics Limited, Ontario, Canada

[21] Appl. No.: 876,868

[22] Filed: Jun. 16, 1997

Related U.S. Application Data

[63] Continuation of Ser. No. 601,615, Feb. 14, 1996, abandoned.

[51] Int. Cl.$^6$ .................................................. G03B 21/56
[52] U.S. Cl. .......................... 359/443; 359/449; 359/460
[58] Field of Search .................................. 359/443, 449, 359/450, 400

[56] References Cited

U.S. PATENT DOCUMENTS

| | | |
|---|---|---|
| 4,984,871 | 1/1991 | Martinez . |
| 5,103,339 | 4/1992 | Broome .................................... 359/443 |
| 5,206,760 | 4/1993 | Nakashima et al. .................... 359/457 |
| 5,317,449 | 5/1994 | Furuno et al. .......................... 359/443 |

*Primary Examiner*—Daniel P. Malley
*Attorney, Agent, or Firm*—Woodard, Emhardt, Naughton, Moriarty & McNett

[57] ABSTRACT

A screen mounting apparatus for supporting a plurality of vertically and horizontally adjacent rear projection screen panels. The apparatus includes an upper mounting member attachable to a first support and to an upper edge of a rear projection screen panel for hanging the rear projection screen panel from the first support along the upper edge. An intermediate member is attachable to a second support and has inner and outer flanges for respectively engaging inner and outer faces of a rear projection screen panel along its lower edge to provide lateral support to the rear projection screen panel along the lower edge. The intermediate member further has securing means for securing an upper edge of an underlying rear projection screen panel to support the rear projection screen panel from the upper edge. A vertical member is also provided securable to a third support and having engaging means for engaging adjacent vertical edges of an adjacent pair of rear projection screen panels to provide lateral support to the rear projection screen panels along the adjacent vertical edges.

15 Claims, 5 Drawing Sheets

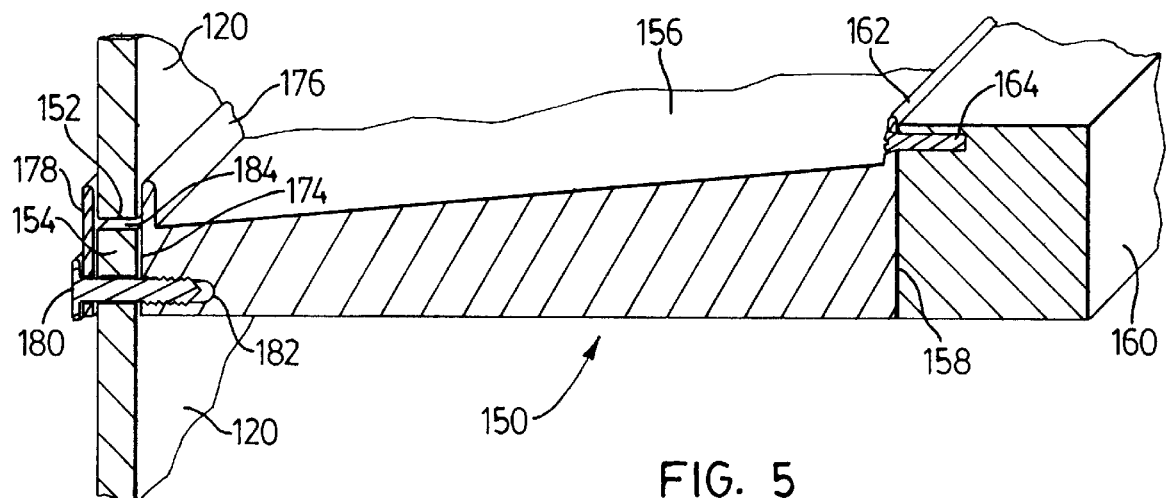
FIG. 5
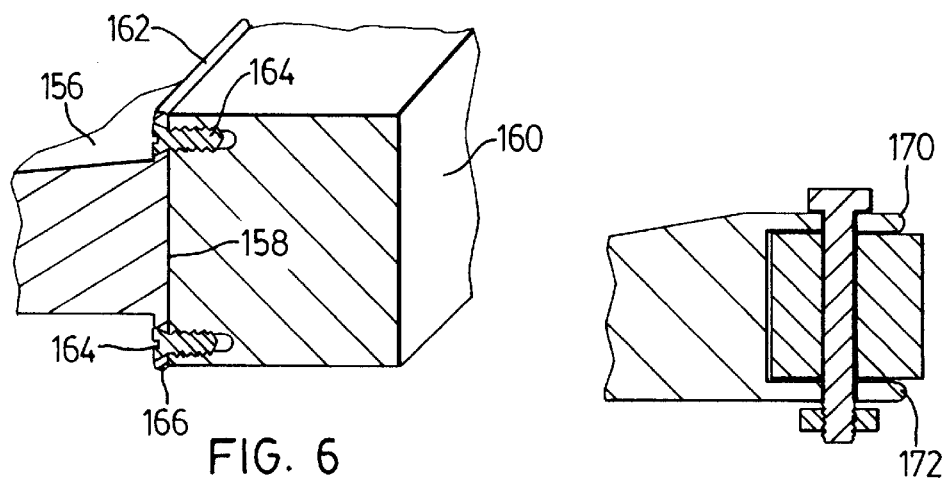
FIG. 6
FIG. 8
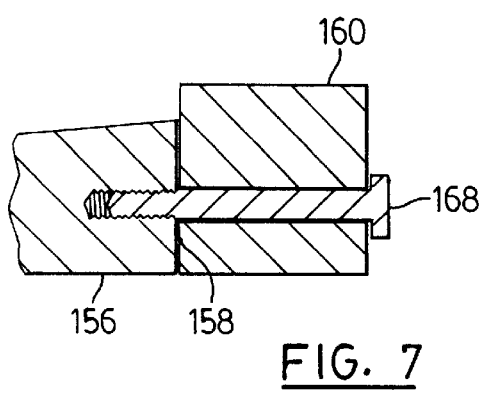
FIG. 7

SCREEN MOUNTING APPARATUS

This application is a continuation, of application Ser. No. 08/601,615, filed Feb. 14, 1996, now abandoned.

FIELD OF THE INVENTION

This invention generally relates to rear projection screens and more particularly relates to the mounting of such screens.

BACKGROUND

Rear projection screens are generally made of an acrylic material having at least one surface textured to present a suitable image. The screens are typically quite large, having a diagonal measurement on the order of 125 in., a thickness of about 0.222 in. and must be mounted securely and precisely relative to the projector. If the screen were to move relative to the projector, the quality of the projected image would deteriorate.

FIGS. 1 and 2b illustrate prior apparatus for mounting and supporting rear projection screens. An apparatus of this type is described in U.S. Pat. No. 5,103,339 to Broome.

The apparatus of FIG. 1 is generally indicated by reference 10 and comprises a first member 12 secured to a rectangular support beam 14. The first member 12 has a generally inverted "L" shaped cross-section with an upright part 16 having a hollow, rectangular cross-section. A lateral part 18 extends from one side of the upright part 16 and is provided with retention prongs 20 and 22 extending downwardly therefrom as viewed in FIG. 1.

A second generally "U" shaped member 24 is securable to the first member 12 in a parallel spaced-apart relationship with the upright part 16. The second member 24 is secured to the lateral part 18 by means of securing prongs 26 and 28 which engage the corresponding retention prongs 20 and 22 respectively.

The upright part 16 of the first member 12 and the second member 24 define between them a generally "U" shaped recess which receives an edge 30 of a screen panel 32. The screen panel 32 is located relative to the lateral part 18 of the first member by a resilient strip 34 of generally rectangular cross-section. The screen panel 32 is located relative to the upright part 16 and the second member 34 by resilient strips 36 wedged between the screen panel 32 and the upright part 16 and between the screen panel 32 and the second member 24.

A disadvantage to the apparatus 10 illustrated in FIG. 1 is that it does not support the screen panel 32 from the top. As rear projection screens are typically made of rather flexible materials, supporting or hanging the screen panel 32 would be a preferable method to avoid undesirable bowing of the screen resulting from supporting the weight of the screen panel 32 on its lower edge. Supporting the screen panel 32 from the bottom limits the dimensions of the screen which may be supported, for example satisfactory results would not be obtained with a thin screen having a large viewing area. Some distortion may also arise if the resilient strips 36 bunch up or snag during installation and result in a bending force applied along the edge 30. With time the resilient strips 36 may fall out of the gap in which they are placed.

The apparatus 10 of FIG. 1 may be used around the perimeter of a screen panel 32, if the screen consists of a single screen panel 32. Larger screens are made up of a number of screen panels 32, joined at adjacent edges. As the apparatus 10 can only receive one edge 30 of a screen panel 32, it cannot be used between adjacent screens.

FIG. 2a illustrates a prior apparatus 50 for supporting the bottom edge 52 of a screen panel 32 and the top edge 54 of an adjacent underlying screen panel 32. The apparatus 50 has a generally rectangular inner member 56 with a rectangular flange 58 extending from opposite faces thereof inwardly from a first end 60. Each of the flanges 58 in combination with the protruding face of the inner member 56 between the first end 60 and the flange 58 define a ridge or step, generally indicated by reference 62. The step 62 is used to support the lower edge 62 of the screen panel 32.

A generally rectangular outer member 64 is secured to the inner member 56 adjacent the flanges 58 to hold the lower edge 62 of the screen panel 32 adjacent the flange 58 and prevent it from slipping off of the step 62. The outer member 64 is secured to the inner member 56 by screws 66 threaded into the end 60 of the inner member 56. The end 66 may be drilled to accept the screws 66 or alternatively, a "U" shaped channel may be formed in the end 60 along the length of the inner member 50. The advantage of the channel is that it can be extruded with the inner member 56 and does not have to be subsequently drilled to receive each of the screws 66.

The top edge 54 of the lower screen panel 32 is secured between the lower flange 58 and the outer member 64. A gap would typically be left between the lower member and the lower step 62 to enable vertical expansion and other movement of the lower screen panel 32.

To protect the screen panels 32, a resilient gasket material 68 may be inserted between the screen panels 32 and the opposed faces of the flanges 58 of the inner member 56 and outer member 64. In u se, the resiliency of the gasket material is also relied upon to enable the screens to join at an angle however this may result in a secured joint.

The apparatus 50 has a second end 70 opposite the first end 60. A slot 72 extends into the second end 70 and runs along its length. The slot 72 enables the inner member 56 to be mounted on a plate or beam 74 which forms part of a supporting structure 76.

A disadvantage to the structure 50 is that it supports the screen panels 32 from their lower edges 52 which, as discussed above, limits the screen dimensions which may be mounted without undesirable bowing. Also, the use of a plate or beam 74 imposes a relatively low support capability on the supporting structure. This is because the weight of the upper screen panel 32 is imposed on the plate or beam 74 in its weakest dimension, namely its thickness.

FIG. 2b illustrates a prior apparatus 80 somewhat similar to the apparatus 50 of FIG. 2a, but intended for use between the vertical edges of adjacent panels rather than between adjacent horizontal edges. To avoid a substantial repetition of the above description of the structure 50 analogous components of the structure 80 have been assigned like reference numerals and the above description of the structure 50 applied to the structure 80 except as noted below.

The apparatus 80 has an inner member 82 in which the first end 60 is flush with the flanges 58. As the weight of the screen panels 32 is not being carried by the inner member 82, there is no requirement for a step or ledge such as step 62 in FIG. 2a. As it is desirable to make the apparatus 80 present as narrow a joint as possible between adjacent screen panels 32, elimination of a step or ledge such as the step 62 in FIG. 2a allows the use of narrower flanges 58 and a correspondingly narrower outer member 64. Nevertheless, the use of screws 66 and the requirement of adequate thickness of material in the inner member 82 at the first end 60 to receive the screws 66 limits how narrow the apparatus 80 may be made.

Another limitation on the breadth of the apparatus 80 arises from the nature of the edges of the screen panels 32. The edges may not be perfectly square or perfectly straight. Accordingly, the flanges 58 and outer member 64 must be broad enough to allow for the aforementioned edge imperfections. Generally one-half inch (½") breadth is required for the flanges 58 and outer member 64 to adequately allow for installation tolerances, trapezoidal panel and crooked edges.

Preferably, the screen panel, 32 should be as large and as thin as possible. Larger panels require less joints thereby enhancing perceived image quality. Thinner screens result in less light loss, less light diffusion and less refraction of light.

SUMMARY OF THE INVENTION

A screen mounting apparatus for supporting a plurality of vertically and horizontally adjacent rear projection screen panels, said system comprising:
- an upper mounting member attachable to a first support and to an upper edge of a rear projection screen panel for hanging said rear projection screen panel from said first support along said upper edge;
- an intermediate member attachable to a second support and having an inner and an outer flange for respectively engaging inner and outer faces of a rear projection screen panel along the lower edge of said rear projection screen panel to provide lateral support to said rear projection screen panel along said lower edge;
- said intermediate member further having securing means for securing an upper edge of an underlying rear projection screen panel to support said rear projection screen panel from said upper edge; and
- a vertical member securable to a third support and having engaging means for engaging adjacent vertical edges of an adjacent pair of rear projection screen panels to provide lateral support to said rear projection screen panels along said adjacent vertical edges.

An upper mounting member for supporting a rear projection screen panel, said member comprising:
- a plurality of pins, each having a shank extending from a head, said head being larger in diameter than said shank;
- a pin supporting member having a channel running along its length with a cross sectional profile corresponding to that of said head and a slot extending between an outer face of said pin supporting member and said channel having a breadth generally corresponding to the diameter of said shank whereby each said pin may be slid along said pin supporting member with said head received by said channel and a portion of said shank extending from said slot; and,
- a cover attachable to said pin supporting member in a generally parallel spaced apart relationship therewith, said cover having a slot extending along its length for receiving an outer end of said shank.

An intermediate member for supporting an upper edge of an underlying rear projection screen panel and a lower edge of an adjacent rear projection screen panel, said intermediate member comprising:
- a first part having a first end securable to a mounting support and a second end opposite said first end;
- an inner flange extending upwardly from said first part at said second end;
- an outer flange securable to said second end in a generally parallel, spaced apart relationship therewith by fasteners extending through said outer flange into said second end below said inner flange.

A vertical member for a screen mounting apparatus securable to a support and having engaging means for engaging adjacent edges of an adjacent pair of rear projection screen panels to provide lateral support to said rear projection screen panels along said edges, said vertical member comprising:
- a pair of generally parallel resilient strips joined along one edge and curving away from each other toward an opposite edge; and,
- an outwardly facing channel running along each said opposite edge for receiving said edge of said rear projection screen panel, said channels being biased away from each other by the resiliency of said strips.

DESCRIPTION OF DRAWINGS

Preferred embodiments of the present invention are described in detail below with reference to the accompanying drawings in which:

FIG. 5 is a transverse section through an intermediate member according to the present invention;

FIG. 6 is a partial sectional view showing, in perspective, an alternative mounting arrangement for an intermediate member according to the present invention;

FIG. 7 is a partial sectional view showing a further alternative mounting arrangement for an intermediate member of the present invention;

FIG. 8 is a partial sectional view through another alternative mounting arrangement for an intermediate member;

DESCRIPTION OF PREFERRED EMBODIMENTS

Figure 3:
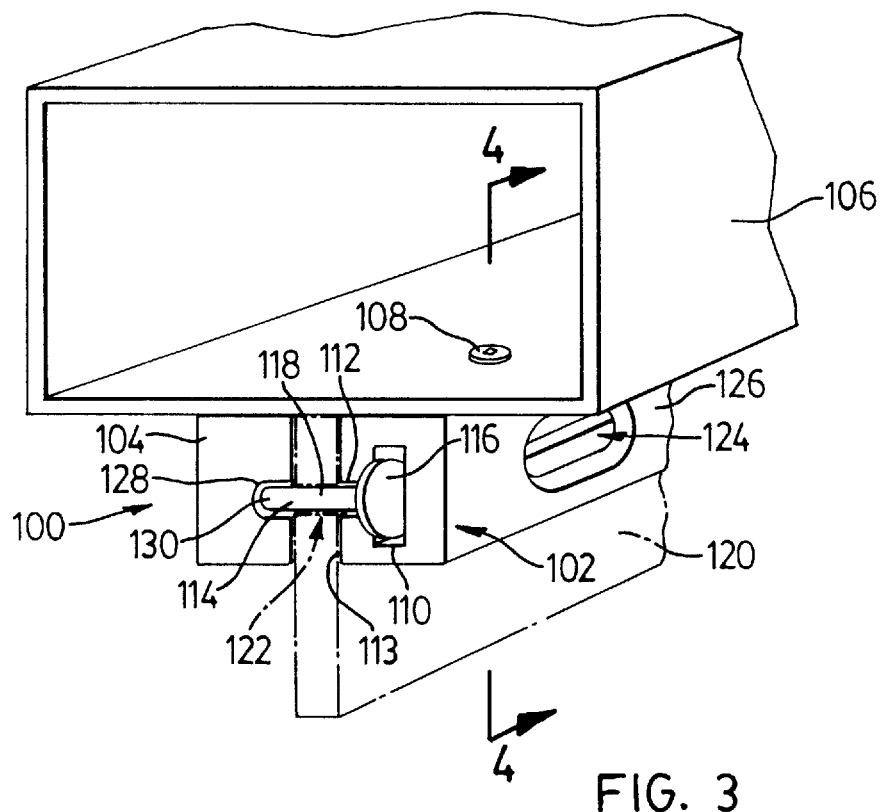
FIG. 3 is a perspective view of an end of an upper mounting member according to the present invention.
Figure 4:
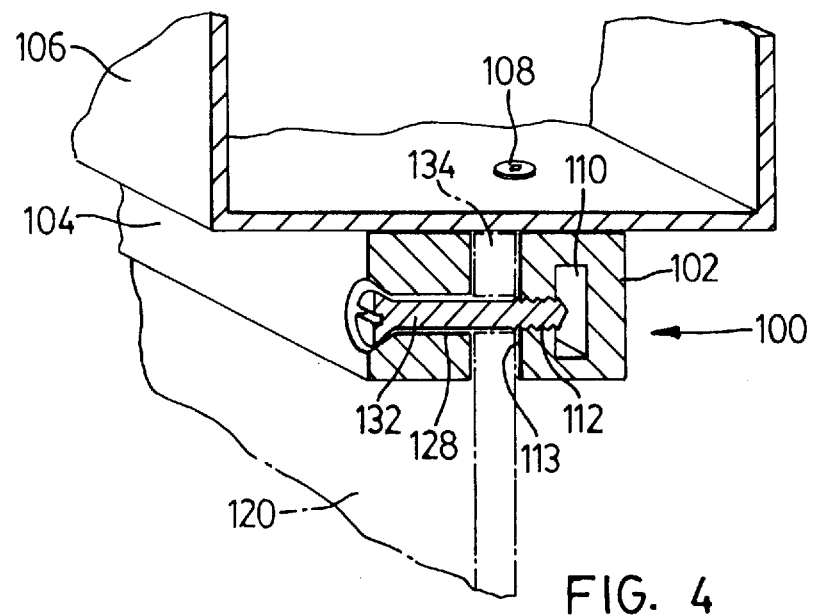
FIG. 4 is a perspective view of section taken on line 4—4 of FIG. 3.
Figure 11:
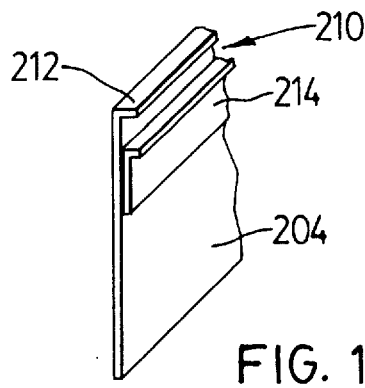
FIG. 11 is a perspective view of an end of one side of a vertical member.

An upper mounting member according to the present invention is generally indicated by reference 100 in FIGS. 3 and 4. The upper mounting member has an elongate rectangular supporting member 102 toward the right as illustrated and an elongate rectangular cover 104 toward the left.

The upper mounting member 102 is attached to the underside of a first support 106 by screws 108. Although the first support 106 is illustrated as tubular, it may have other configurations and for example may be open along the top or have openings through the top to facilitate the insertion of screws 108. Alternatively, fastening means other than screws 108 could be used, such as welding, if more desirable in certain circumstances.

The first support 106 would typically form part of a projection structure and may be supported by whatever framework is provided as part of the structure for supporting the projectors.

The pin supporting member 102 has a generally rectangular channel 110 running along its length. A slot 112 extends between the channel 110 and an outer face 113 of the pin supporting member 102. As the name suggests, the pin supporting member 102 supports pins such as pin 114. The pin 114 has a head 116 having a profile corresponding to the shape of the channel 110 and a shank 118 having a diameter generally corresponding to the breadth of the slot 112. Accordingly each pin 114 may be slid along the pin supporting member 102 with the head 116 of the pin 114 received in the channel 110 and the shank 118 of the pin 114 extending through the slot 112.

A rear projection screen panel 120 (shown in dashed outline) may be suspended from the pins 114 by drilling holes 122 through the panel 120 and mounting the holes 122 over the portion of the shanks 118 of the pins 114 extending from the slot 112. As the pins 114 may be slid along the length of the pin supporting member 102, the spacing of the holes 122 along the panel 120 is not critical however care should be taken to ensure that the holes 122 generally line up along the top edge of the panel 120.

The pins may either be slid into an end of the pin supporting member 102 or alternatively the pin supporting member 102 may be provided with openings 124 through a face 126 opposite the outer face 113. The openings 124 extend into the channels 110 and are large enough to allow the heads 116 of the pins 114 to be inserted therethrough.

The cover 104 has a slot 128 extending along its length for receiving an outer end 130 of the shank 118 of the pins 114. As illustrated in FIG. 4, the cover 104 may be attached to the pin supporting member 102 in parallel spaced apart relationship therewith by screw fasteners 132 extending through suitable drilled holes 134 in the panel 120, through the slot 128 in the cover, and threadedly engaging the slot 112 in the pin supporting member 102.

Figure 1:
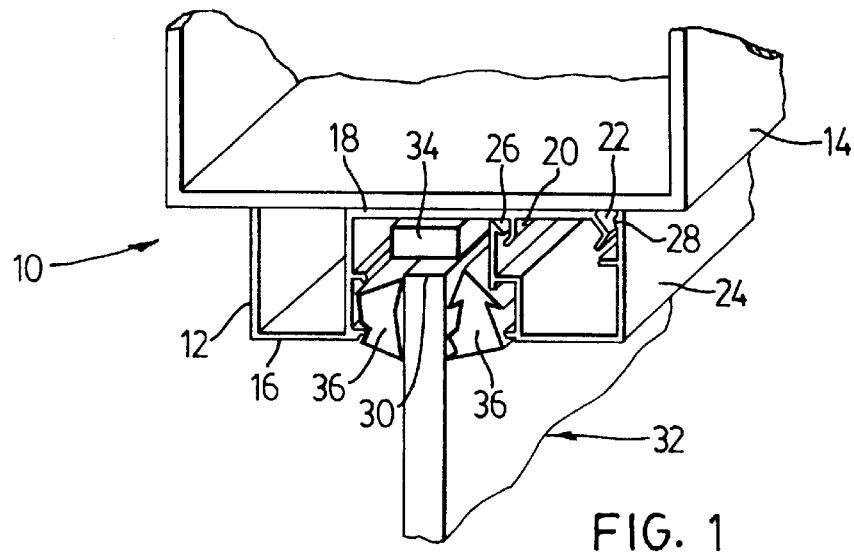
FIG. 1 is a perspective view showing an end of a prior art structure for supporting the top of a rear projection screen panel.

The upper mounting member 100 hangs each panel 120 along its upper edge and therefore the weight of the panel 120 acts to hold the panel 120 straight rather than to bend the panel 120 as in the prior art devices. Accordingly, the upper mounting member 100 can effectively be used to support panels which are both larger and thinner than can be supported by the prior art apparatus such as illustrated in FIG. 1. The upper mounting member 100 allows the upper edge of the panels 120 to be accessed for removal or replacement by removing the cover 104. Unlike the prior art device, access to both sides of the panel is not required for replacing the panel.

FIG. 5 illustrates an intermediate member 150 for supporting the lower edge 152 of a panel 120 and supporting an underlying panel 120 from adjacent its upper edge 154. The intermediate member 150 has a first part 156 with a first end 158 to the right in FIG. 5 securable to a second support 160. The second support 160 may in turn be secured to the framework used to support the projectors.

FIG. 5 illustrates the first part 156 having, at the first end 158, an upwardly extending flange 162 through which a screw 164 extends and threadedly engages the second support 160. Other mounting arrangements or securing means are illustrated in FIGS. 6, 7 and 8.

FIG. 6 illustrates a mounting arrangement or securing means having a second, downwardly extending flange 166 secured to the second support 160 by a further screw 164.

FIG. 7 illustrates a securing means where no flanges are provided on the first part 156 but rather, a bolt 168 extends through the second support 160, into the first end 158 of the first part 156, and threadedly engages the first part 156.

FIG. 8 illustrates a securing means having generally parallel upper and lower flanges, 170 and 172 respectively, extending outwardly from the first end 158 of the first part 156. A bolt 173 extends through the upper flange 170 through the second support 160 and through the lower flange 172.

As illustrated in FIG. 5, the first part 156 of the intermediate member 150 has a second end 174 opposite the first end 158. An inner flange 176 extends upwardly from the second end 174.

The intermediate member 150 further has an outer flange 178 which is shown as a generally rectangular cross-section strip running along the second end 174 in a parallel, spaced-apart relationship therewith. The outer flange 178 is secured to the first part 156 by screws 180 extending into the second end 174 of the first part 156. The first part 156 may be provided with a "U" shaped recess 182 extending into the second end 174 for receiving and threadedly engaging the screws 180. Alternatively, holes could be provided extending into the second end 174 however this would require ensuring that the spacing of screw holes be accurate to ensure alignment on assembly.

The lower edge 152 of the upper panel 120 is laterally supported between the inner and outer flanges, 176 and 178 respectively. The upper edge 154 of the lower panel 120 is laterally supported between the inner and outer flanges, 176 and 178 respectively. The lower panel 120 is also vertically supported by (suspended from) the screws 180 which extend through suitable holes in the panel 120 into the first end 174. A gap 184 is left between the lower edge 152 and upper edge 154 to allow for expansion and contraction.

Figure 2A:
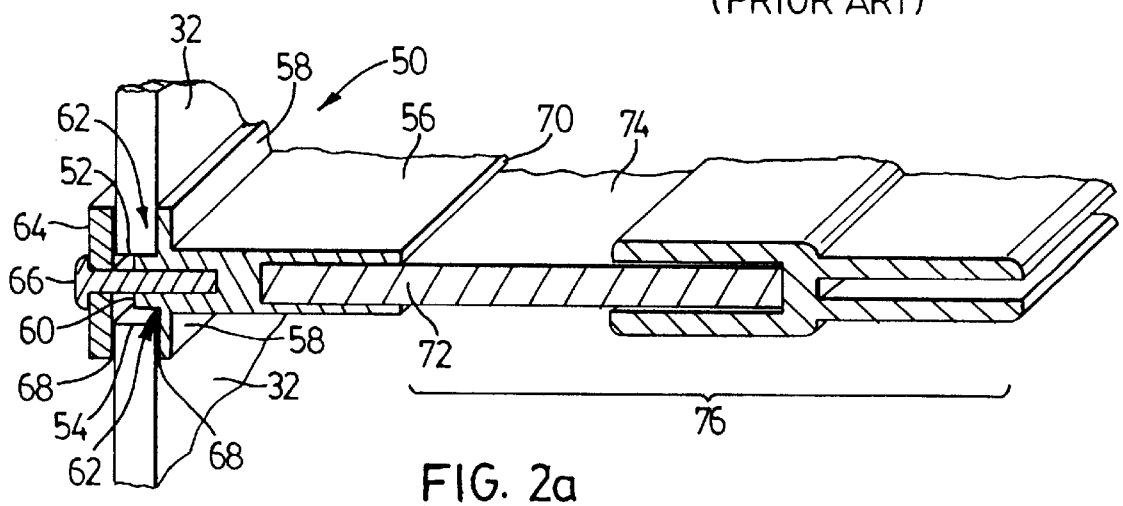
FIG. 2a is a cross-section through a prior art structure for supporting the bottom of a rear projection screen panel and the top of an adjacent rear projection screen panel.

An advantage to the intermediate member of the present invention is that it enables hanging of the underlying panels thereby using the weight of the panels to assist in avoiding warpage or buckling. This enables the mounting of thinner panels of larger area than possible with the prior art system. A further advantage to the intermediate member of the present invention is that as the screw 180 passes directly through the panel 120 into the first part 156, there is no requirement for a downwardly extending flange such as flange 58 in FIG. 2a illustrating a prior art device. Accordingly, the breadth of what would otherwise have comprised the height of the lower flange can be used in the thickness of the first part 156 to provide a more robust structure having much more resistance to binding than the plate or beam 74 in FIG. 2a.

Figure 9:
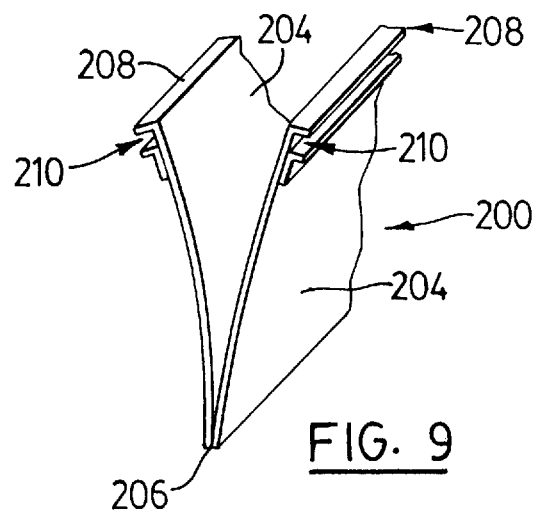
FIG. 9 is a perspective view showing an end of a vertical member according to the present invention.
Figure 10:
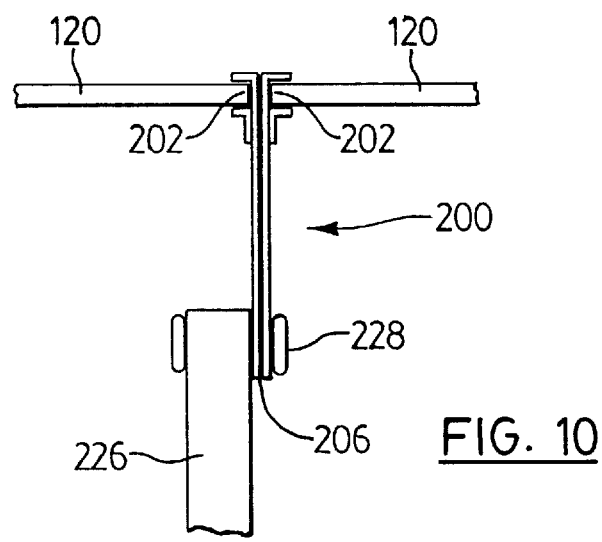
FIG. 10 is a plan view showing a vertical member according to the present invention in use.

FIG. 9 illustrates a vertical member 200 according to the present invention which, as illustrated in FIG. 10, may be used to laterally support the adjacent side edges 202 of a pair of adjacent panels 120. The vertical member 200 has a pair of generally parallel elongate rectangular strips 204 generally parallel to one another and joined along one edge 206. The strips 204 are of resilient material, such as spring steel, and curve away from each other toward respective opposite edges 208.

An outwardly facing channel 210 runs along each of the opposite edges 208. The channels 210 are biased away from each other by the resiliency of the strips 204. The side edges 202 are received by the channels 210.

Figure 12:
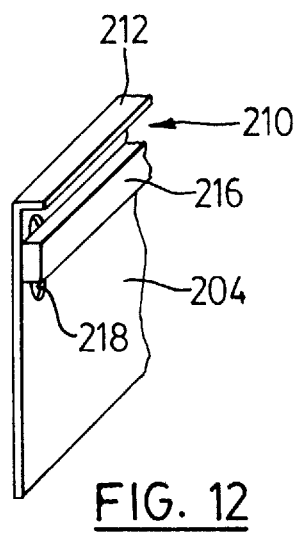
FIG. 12 is a perspective view of an end of one side of an alternate embodiment for a vertical member.
Figure 13:
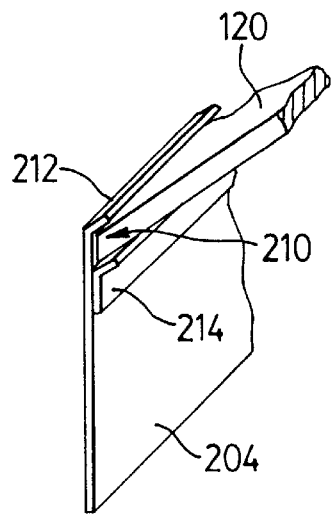
FIG. 13 is a perspective view of an end of one side of a vertical member having an angled channel.

The channels 210 may be formed in various ways and have various configurations such as illustrated in FIGS. 11 through 14. FIG. 9 illustrates a strip 204 having a generally rectangular, rolled over edge 212. An "L" shaped strip 214 is secured below the rolled over edge 212 and the channel 210 is formed therebetween. FIG. 13 illustrates a similar arrangement showing an angled channel 210 which (i.e. not perpendicular to the strip 204) which would be used in an angled installation.

Figure 14:
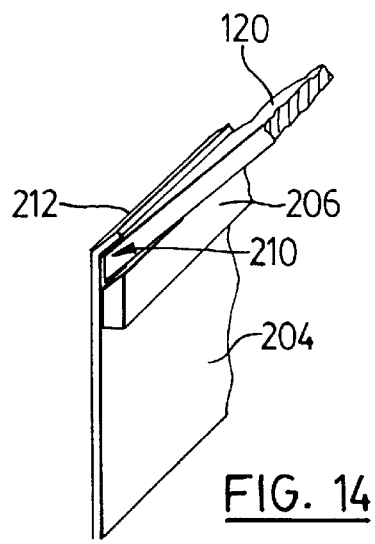
FIG. 14 is a perspective view of an end of one side of an alternate embodiment vertical member having an angled channel.

FIGS. 12 and 14 illustrate the use of a block 216 secured to the strip 204 below the rolled over edge 208. FIG. 12 illustrates a non-angled screen configuration while FIG. 14 illustrates an angled screen configuration. An advantage to the block 216 is that it may be thick enough to receive a screw fastener for securing the block 216 to the strip 204. If the strip is provided with a slotted hole such as shown at 218 in FIG. 12, means are then provided for varying the breadth of the channel 210 to accommodate panels 102 of different thicknesses.

Figure 2B:
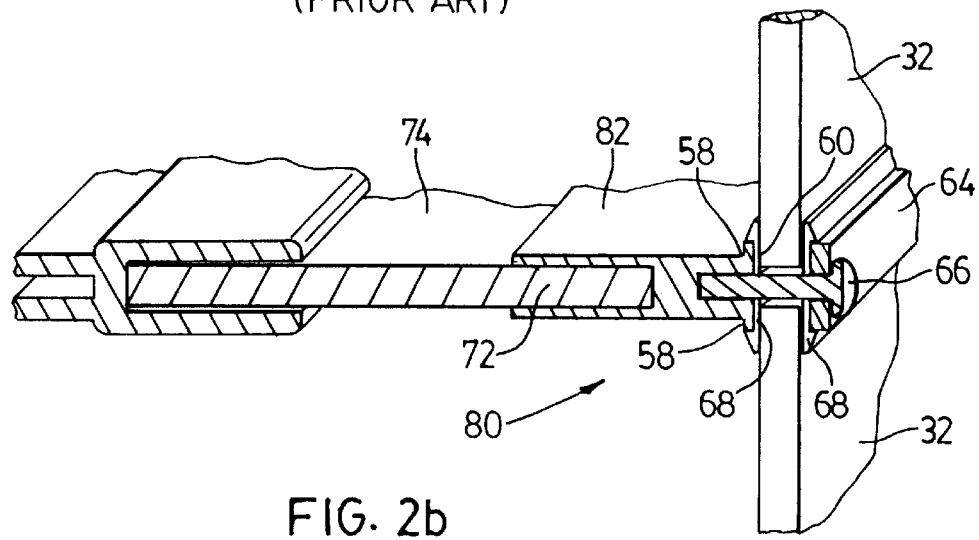
FIG. 2b is a cross-section through a prior art structure for supporting adjacent vertical rear projection screen panels.

In the prior art device 80 in FIG. 2b, the inner and outer flanges, 58 and 64 respectively, have to be broad enough to accommodate the fasteners 66 and to allow for a less than perfectly straight edge on the panel 32. The vertical member 200 of the present invention eliminates the use of a fastener such as 66 and the resilient biasing of the channels 210 allows movement of the channels 210 toward or away from each other to accommodate edge imperfections.

Figure 15:
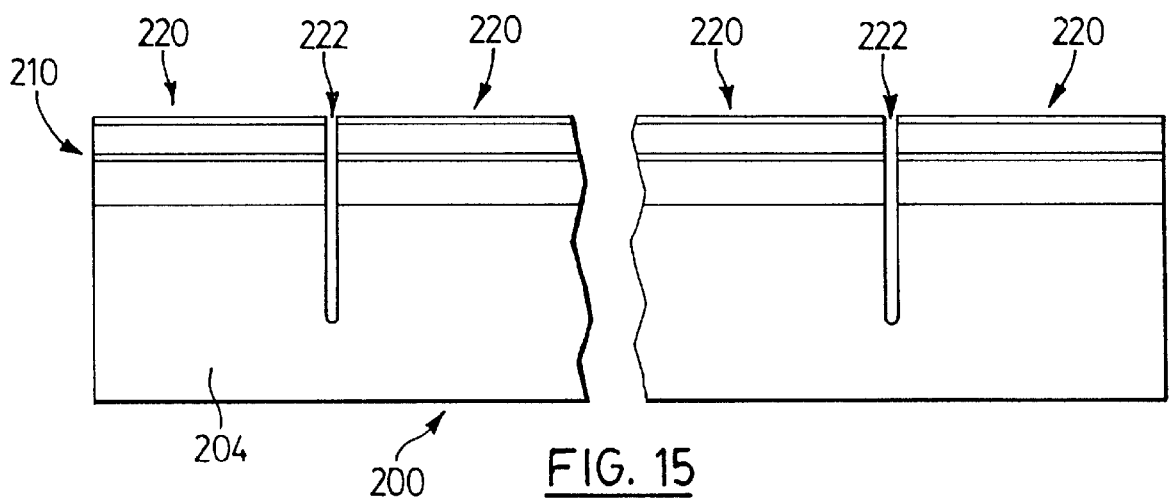
FIG. 15 is a front elevation of a segmented vertical member.

FIG. 15 illustrates a vertical member 200 according to the present invention which is divided into sections 220 by slots 222 extending inwardly from the opposite edge 208 of the strips 204 and across a substantial portion (on the order of ½ to ¾) of the breadth of the strips 204. The slots 222 enable each section 220 to move independently from the remaining sections 220 and accordingly allow the corresponding portion or section of the channels 210 to move independently. In this manner, the channels can move to accommodate varying breadth gaps between the adjacent panels 120 thereby minimizing the necessary depth of the channels 120. With this configuration, the channels may in some cases be as shallow as ⅛ in.

The vertical members 200, as illustrated in FIG. 10 may be secured both to each other and to a third support 226 by suitable means such as the rivet 228 shown. The third support 226 may be secured to the framework used to support the projectors.

The upper member 100 and intermediate member 150 may be extruded, for example, from aluminum. The vertical member 200 would typically be made at least in part from a resilient sheet metal and may be manufactured by rolling the parts to shape and spot-welding or riveting them together. Other methods of manufacture may be apparent to appropriately skilled persons and it is not intended to restrict the scope of the present invention to any particular material or method of manufacture.

The above detailed description should be interpreted in an illustrative rather than a restrictive sense. Variations to the described embodiments may be possible without departing from the spirit and scope of the present invention as described in the claims set out below.

I claim:

1. A screen mounting apparatus for supporting a plurality of vertically and horizontally adjacent rear projection screen panels, said system comprising:

an upper mounting member attachable to a first support and to an upper edge of a rear projection screen panel for hanging at least two of said rear projection screen panels from said first support along said upper edge; and allowing movement of said at least two rear projection screen panels along said upper mounting member during installation;

an intermediate member attachable to a second support and having an inner and an outer flange for respectively engaging inner and outer faces of a rear projection screen panel along the lower edge of said rear projection screen panel to provide lateral support to said rear projection screen panel along said lower edge, said intermediate member further having fasteners extending through an upper edge of an underlying rear projection screen panel to hang said rear projection screen panel from said upper edge; and, a vertical member securable to a third support and having engaging means for engaging adjacent vertical edges of an adjacent pair of rear projection screen panels to provide lateral support to said rear projection screen panels along said adjacent vertical edges.

2. A screen mounting apparatus as claimed in claim 1 wherein said upper mounting member includes:

a plurality of pins, each having a shank extending from a head, said head being larger in diameter than said shank and said shank being insertable through holes along said upper edge of said rear-projection screen panel to attach said panel to said upper mounting member;

a pin supporting member having a channel running along its length with a cross sectional profile corresponding to that of said head, a slot extending between an outer face of said pin supporting member and said channel having a breadth generally corresponding to the diameter of said shank whereby each said pin may be slid along said pin supporting member with said head received by said channel and a portion of said shank extending from said slot; and, a cover attachable to said pin supporting member in a generally parallel spaced apart relationship therewith, said cover having a slot extending along its length for receiving an outer end of said shank.

3. A screen mounting apparatus as claimed in claim 1 or 2 wherein said intermediate member further comprises:

a first part having a first end securable to said second support and a second end opposite said first end;

said inner flange extends upwardly from said first part at said second end;

said outer flange is a strip securable to said second end in a generally parallel, spaced apart relationship therewith by said fasteners which further extend through said strip into said second end below said inner flange; and, said underlying rear projection screen panel is provided with holes along its upper edge through which said fasteners extend to hang said underlying rear projection screen panel from said upper edge, without imparting a bending moment to said upper edge.

4. A screen mounting apparatus as claimed in claim 1 or 2 wherein said vertical member includes:

a pair of generally parallel resilient strips joined along one edge and curving away from each other toward an opposite edge; and, an outwardly facing channel running along each said opposite edge for receiving an edge of said rear projection screen panel, said channels being biased away from each other by the resiliency of said strips.

5. A screen mounting apparatus as claimed in claim 3 wherein said vertical member includes:
- a pair of generally parallel resilient strips joined along one edge and curving away from each other toward an opposite edge; and,
- an outwardly facing channel running along each said opposite edge for receiving an edge of said rear projection screen panel, said channels being biased away from each other by the resiliency of said strips.

6. A screen mounting apparatus as claimed in claim 4 wherein said channels are divided into sections by slots extending inwardly from said opposite edge of each of said strips, across said channels and across a substantial portion of said strips to enable each of said sections to move independently from the remaining sections against said resiliency of said strips.

7. A screen mounting apparatus as claimed in claim 5 wherein said channels are divided into sections by slots extending inwardly from said opposite edge of each of said strips, across said channels and across a substantial portion of said strips to enable each of said sections to move independently from the remaining sections against said resiliency of said strips.

8. An upper mounting member for supporting a rear projection screen panel, said member comprising:
- a plurality of pins, each having a shank extending from a head, said head being larger in diameter than said shank;
- a pin supporting member having a channel running along its length with a cross sectional profile corresponding to that of said head and a slot extending between an outer face of said pin supporting member and said channel having a breadth generally corresponding to the diameter of said shank whereby each said pin may be slid along said pin supporting member with said head received by said channel and a portion of said shank extending from said slot; and,
- a cover attachable to said pin supporting member in a generally parallel spaced apart relationship therewith, said cover having a slot extending along its length for receiving an outer end of said shank.

9. An upper mounting member as claimed in claim 8 further having at least one opening extending from said channel through a rear face of said pin supporting member opposite said outer face, said opening being large enough to enable said pin to be inserted therethrough.

10. An intermediate member for supporting an upper edge of an underlying rear projection screen panel and a lower edge of an adjacent rear projection screen panel, said intermediate member comprising:
- a first part having a first end securable to a mounting support and a second end opposite said first end;
- an inner flange extending upwardly from said first part at said second end;
- an outer flange securable to said second end in a generally parallel, spaced apart relationship therewith by fasteners extending through said outer flange into said second end below said inner flange.

11. An intermediate member as claimed in claim 10 further having a mounting flange extending upwardly from said first part at said first end for receiving fasteners therethrough to secure said first part to said support.

12. An intermediate member as claimed in claim 11 wherein said first part has a further downwardly extending mounting flange at said first end through which fasteners may be inserted to secure said first part to said support.

13. An intermediate member as claimed in claim 10 further having a pair of generally parallel, spaced-apart flanges extending from said first end for receiving at least part of said second member therebetween.

14. A vertical member for a screen mounting apparatus securable to a support and having engaging means for engaging adjacent edges of an adjacent pair of rear projection screen panels to provide lateral support to said rear projection screen panels along said edges, said vertical member comprising:
- a pair of generally parallel resilient strips joined along one edge and curving away from each other toward an opposite edge; and,
- an outwardly facing channel running along each said opposite edge for receiving said edge of said rear projection screen panel, said channels being biased away from each other by the resiliency of said strips.

15. A vertical member as claimed in claim 13 wherein said channels are divided into sections by slots extending inwardly from said opposite edge of each of said strips, across said channels and across a substantial portion of said strips to enable each of said sections to move independently from the remaining sections against said resiliency of said strips.

* * * * *